United States Patent
Lewis et al.

(10) Patent No.: US 7,631,921 B2
(45) Date of Patent: Dec. 15, 2009

(54) CLOSURE SYSTEM FOR A VEHICLE

(75) Inventors: Phillip J. Lewis, Rochester, MI (US); Richard A. Manning, Sterling Heights, MI (US); Robert J. Faubert, Shelby Township, MI (US); Alexander Zelikov, White Lake, MI (US)

(73) Assignee: Chrysler Group LLC, Auburn Hills, MI (US)

(*) Notice: Subject to any disclaimer, the term of this patent is extended or adjusted under 35 U.S.C. 154(b) by 0 days.

(21) Appl. No.: 12/112,086

(22) Filed: Apr. 30, 2008

(65) Prior Publication Data

US 2009/0273207 A1 Nov. 5, 2009

(51) Int. Cl.
*B62D 33/023* (2006.01)

(52) U.S. Cl. ........................................ 296/51

(58) Field of Classification Search .............. 296/50, 296/51, 55, 56, 146.8, 146.11, 146.12, 146.13
See application file for complete search history.

(56) References Cited

U.S. PATENT DOCUMENTS

| | | | |
|---|---|---|---|
| 3,716,945 A | 2/1973 | Cooper et al. | |
| 4,620,743 A | 11/1986 | Eke | |
| 5,921,611 A * | 7/1999 | Townsend | 296/155 |
| 6,007,139 A | 12/1999 | Shave | |
| 6,068,327 A | 5/2000 | Junginger | |
| 6,234,563 B1 | 5/2001 | Bascon | |
| 6,234,564 B1 * | 5/2001 | Kim | 296/146.8 |
| 6,454,341 B2 | 9/2002 | Tolinski | |

* cited by examiner

*Primary Examiner*—H Gutman
(74) *Attorney, Agent, or Firm*—Ralph E. Smith (57) ABSTRACT

A closure system with a reduced out-swing reach for an opening in a body of a vehicle. The closure system has an upper portion arranged to expose at least a section of the body opening, and a lower portion which is guided by a track to an open position when the upper portion is not in a closed position.

20 Claims, 7 Drawing Sheets

CLOSURE SYSTEM FOR A VEHICLE

FIELD OF THE INVENTION

The present invention relates to a closure for an opening in a body of a vehicle that can be conveniently raised and/or lowered when the vehicle is parked in a confined space.

BACKGROUND OF THE INVENTION

Vehicles that have the capacity to transport substantial amounts of cargo have experienced consistent consumer demand. Such vehicles typically have a relatively large body opening so that objects which would not fit through the traditional door openings could be loaded into the cargo area. The cargo opening is frequently positioned in the aft-end of the vehicle body, and in many cases the closure design comprises a hinged liftgate for convenient access.

Typically, the liftgate can be hinged at the aft-end along the subject vehicle's roof. This permits the liftgate to swing up and away for loading or unloading cargo. Full articulation of a roof-hinged liftgate, however, requires an open area for liftgate out-swing, i.e. pitching of the liftgate's free end in a rearward direction outside the vehicle boundary. As a consequence, when a roof-hinged liftgate is used to enclose a more upright aft-end vehicle body outline, as is typical with vans and sport utility vehicles (SUVs), a significant amount of free space is needed behind the vehicle in order to accommodate the liftgate's out-swing. Thus, attempting to access the cargo area of a large van or an SUV may be inconvenient in those cases when the vehicle is to be parked with its rear end in close proximity to a garage wall or other barrier.

SUMMARY OF THE INVENTION

The present invention is a closure system for a vehicle having a body opening bounded by a floor, two sides and a roof. According to the invention the closure system has an upper portion attached to the body adjacent the roof. The upper portion is arranged to move from a closed position restricting the opening to an open position exposing at least a section of the opening. The closure system also has a track mounted at each side of the body opening, and a lower portion guided by said track from a closed position, wherein the lower portion is adjacent the floor, to an open position proximate the roof when the upper portion is not in a closed position. The upper portion may be attached to the body by one or more hinges, and arranged to pivot about the hinge(s) from the closed position to the open position. The upper portion may also be attached to the body by a linkage arranged to lift the upper portion from the closed position to the open position.

The lower portion may be disposed under the upper portion in a nested relationship when both of the closure portions are in their respective open positions. A mechanical interlock may be included between the upper portion and the lower portion, wherein the mechanical interlock is arranged to move the upper portion and the lower portion sequentially, i.e. in tandem. The sequential movement according to the invention includes the upper portion moving ahead of the lower portion when the closure is being opened, and the lower portion moving ahead of the upper portion when the closure is being closed.

The closure system may also include an electric motor mounted on the vehicle and arranged to drive the mechanical interlock. The electric motor may be arranged for remote activation by an operator, either from within the vehicle or externally to the vehicle, such as via a key fob.

The closure system may form a vehicle liftgate. As used herein, the term "liftgate" is used to mean a closure having a door positioned in the aft-end of the vehicle, which is hinged at its upper edge to the vehicle roof and arranged to swing up and outward relative to the body opening.

It should be understood that the detailed description and specific examples which follow, while indicating preferred embodiments of the invention, are intended for purposes of illustration only and are not intended to limit the scope of the invention.

DETAILED DESCRIPTION OF THE INVENTION

In general, the present invention relates to a closure for a vehicle body opening. A particular embodiment of the invention is a liftgate for a vehicle, such as, for example, a van or an SUV, that can be conveniently raised and/or lowered, i.e. a closure in the vehicle aft-end for convenient access to the cargo area. According to the invention, the closure system has an out-swing reach, i.e. the distance the closure system's free end will pitch outside the vehicle boundary when opened, which is substantially reduced in comparison with the out-swing reach for a typical one-piece vehicle liftgate.

Figure 1:
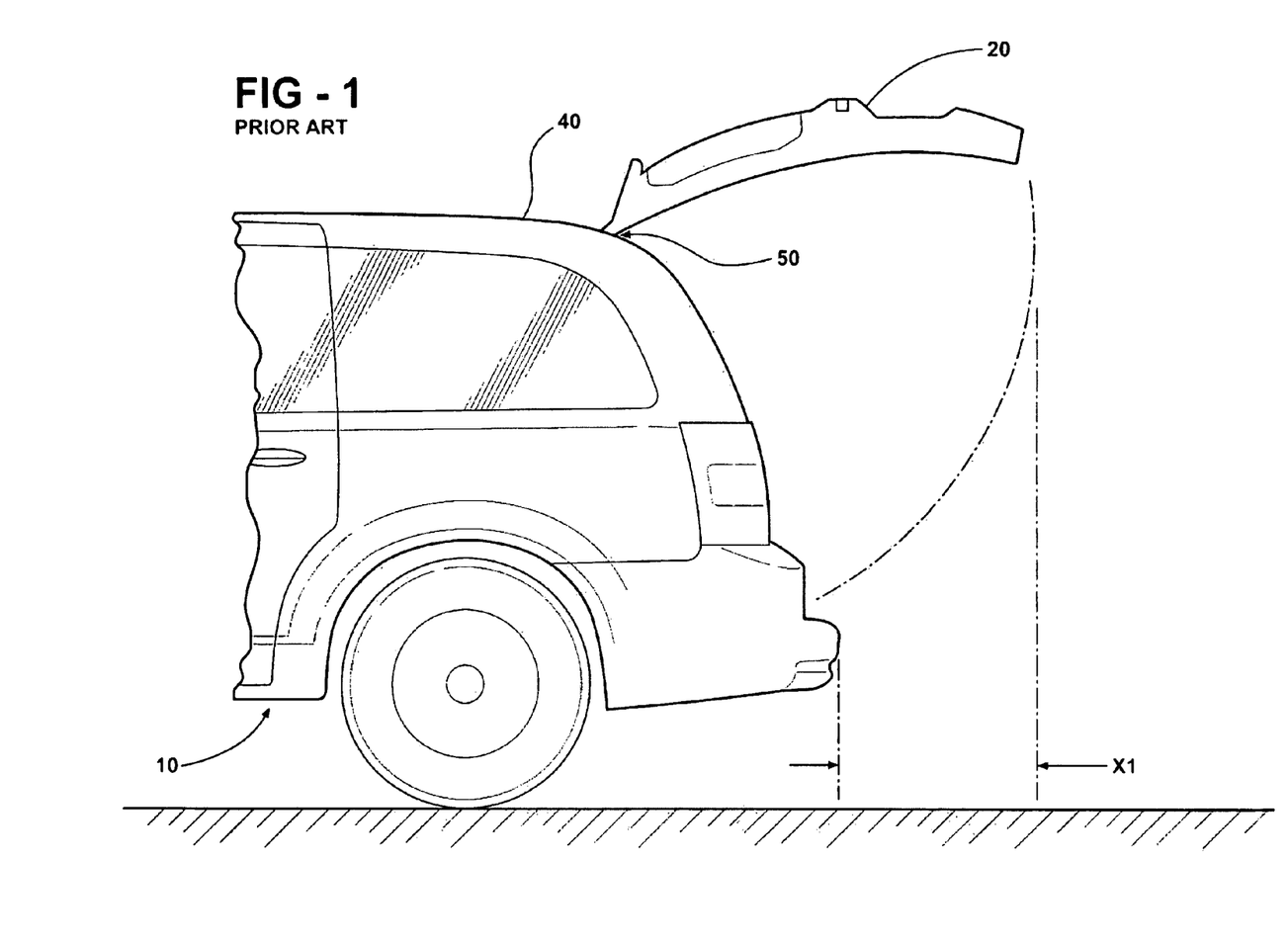
FIG. 1 is a side view of a vehicle back end with a typical one-piece pivoting liftgate in an open position.

Referring now to the drawings, like elements of the invention are identified with identical reference numerals throughout. FIG. 1 denotes an elevational side view of vehicle aft-end 10 with a typical one-piece liftgate 20, generally used to cover an opening in a body of a vehicle. One-piece liftgate 20 is attached to roof 40 via at least one hinge 50. As shown, one-piece liftgate 20 pivots from a closed position where it is in sealing engagement with the floor, side edges and roof of the opening to a generally extended open position. The space required behind the aft-end of the vehicle to clear the extended open liftgate 20, i.e. the liftgate's out-swing reach, is denoted by dimension X1.

Figure 2:
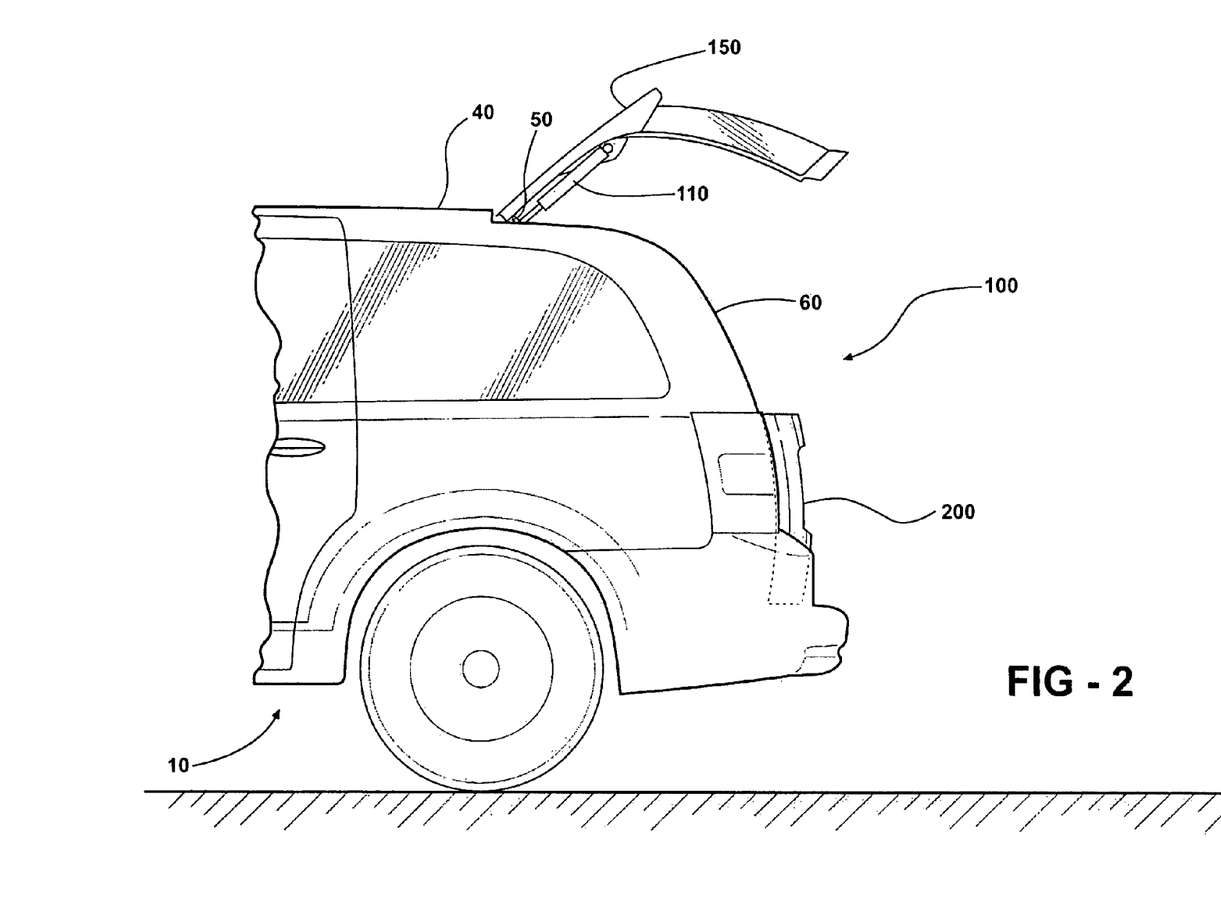
FIG. 2 is a side view of a vehicle aft-end with a closure system configured as a liftgate and having an upper portion in an extended open position and a lower portion in a closed position according to the invention.

Closure system 100 according to the present invention configured as a liftgate is best seen in FIGS. 2-6. FIG. 2 denotes-closure system 100 attached to vehicle aft-end 10. Closure system 100 includes a generally rectangular upper portion 150 and a corresponding lower portion 200 that work in concert to cover and uncover the vehicle's rear opening.

When both upper portion 150 and lower portion 200 are in their respective closed positions (not shown), closure system 100 fully covers opening 30. The edges of upper portion 150 are in scaling engagement with the corresponding upper side edge portions and roof of the vehicle opening. The edges of lower portion 200 are in sealing engagement with the corresponding lower side edge portions and floor of the vehicle opening. Both upper portion 150 and lower portion 200 serve as exterior body panels for the vehicle and may be manufactured from any suitable vehicle body material, such as, for example, steel, aluminum or engineered plastic.

Figure 3:
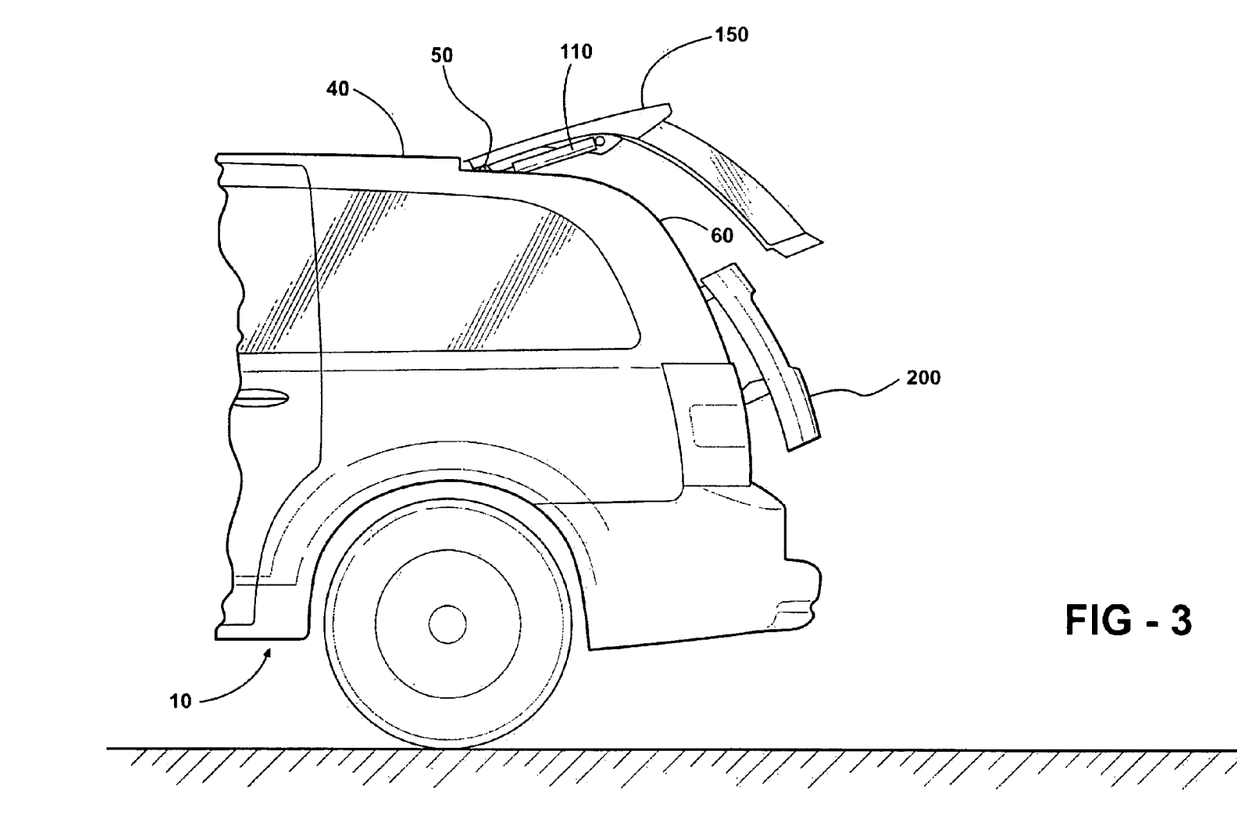
FIG. 3 is a side view of a vehicle aft-end with the closure system configured as a liftgate and having the upper portion in the extended open position and the lower portion in an intermediate position according to the invention.
Figure 4:
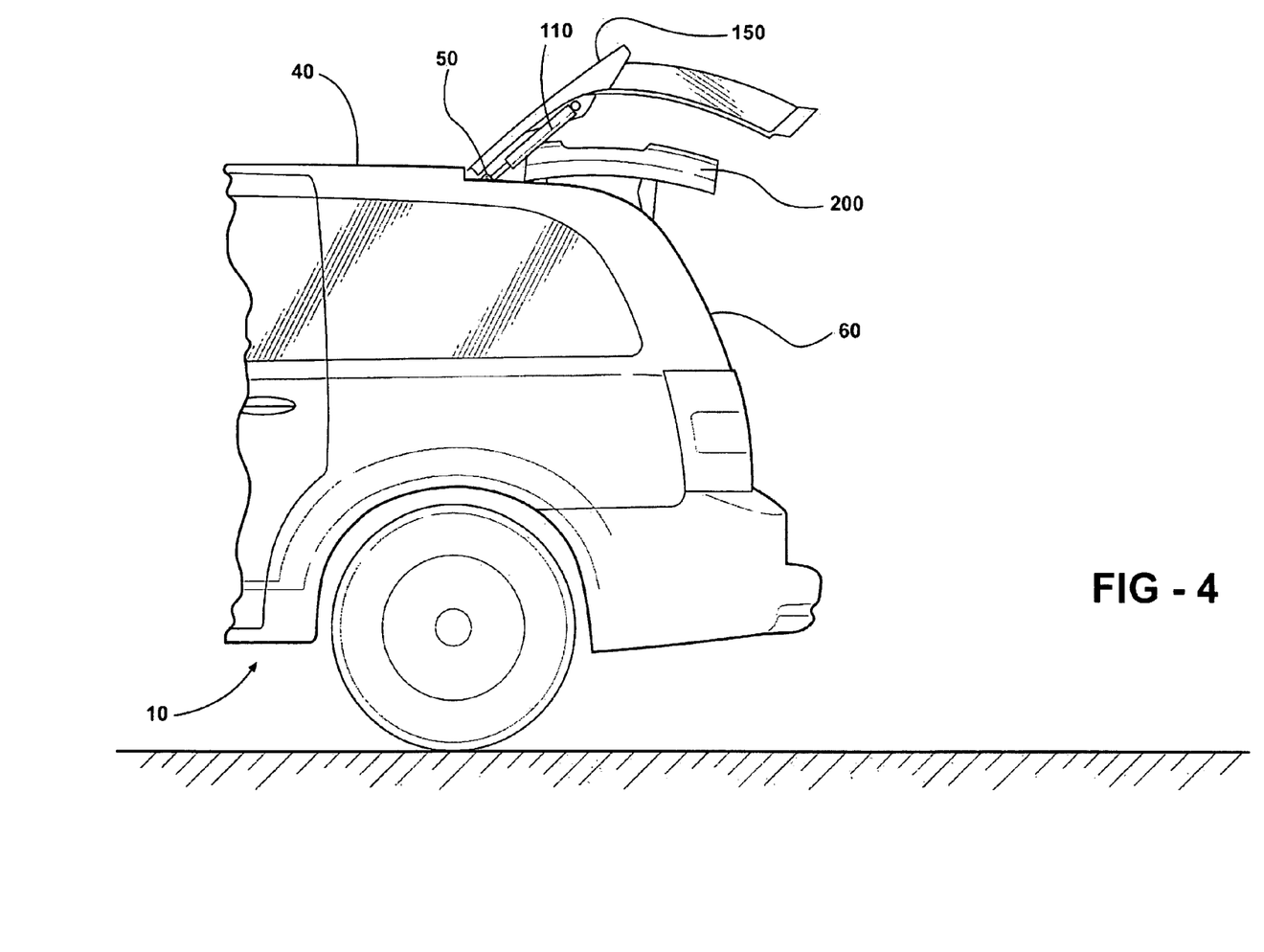
FIG. 4 is a side view of a vehicle aft-end with the closure system configured as a liftgate and having the upper portion in the extended open position and the lower portion in an open position according to the invention.

For uncovering access into the vehicle, upper portion 150 and lower portion 200 are activated sequentially, or in tandem. According to the invention, the upper portion moves ahead of the lower portion when the closure is being opened, and the lower portion moves ahead of the upper portion when the closure is being closed. Rear opening 30 of the vehicle is accessed by first moving upper portion 150 from the closed position to its full open position, as shown in FIG. 2. Lower portion 200 then moves from its respective closed position, as shown in FIG. 3, to its full open position in a nested relationship with respect to the upper portion of the closure system, as shown in FIG. 4. Opening 30 is fully exposed for access into the vehicle when both upper portion 150 and lower portion 200 complete their movement to respective open positions. When both upper portion 150 and lower portion 200 are in the open position, the lower portion is in a nested relationship with respect to the upper portion, thereby achieving a more compact open liftgate arrangement. The upper portion may also be arranged to extend partially into the roof to further enlarge the opening when the upper portion and the lower portion are in their fully open positions (shown in FIGS. 2-4 and 6).

Upper portion 150 covers an upper section of opening 30 and is attached to roof 40 via at least one hinge 50 for pivoting from its closed position generally flush with side edges 60 of opening 30 to a generally extended open position. Preferably, for case and convenience, movement of the upper portion may be assisted by hydraulic struts 110 located on either side of the opening as shown. Each hydraulic strut has one end attached to roof 40 adjacent one of side edges 60 and a distal end attached to upper portion 150. It should be noted, however, that any convenient arrangement that requires the upper portion to be out of its closed position for the lower portion to open is considered to be within the scope of the present invention. Any closure system having a lower sliding portion and an upper portion arranged to move sequentially in cooperation with the lower portion is contemplated. Other hinged type arrangements that provide for movement of the upper portion of the closure system generally up and rearward of the opening so that the lower portion of the closure system can nest beneath the upper portion when both portions are in their fully open positions may also be suitable. For example, the upper portion may be primarily arranged to lift-up rather than simply pivot. Such an alternatively arranged lift-up upper portion may be operated via specially adapted four-bar hinge 80 (shown in FIG. 6) or a scissors-type linkage.

Figure 5:
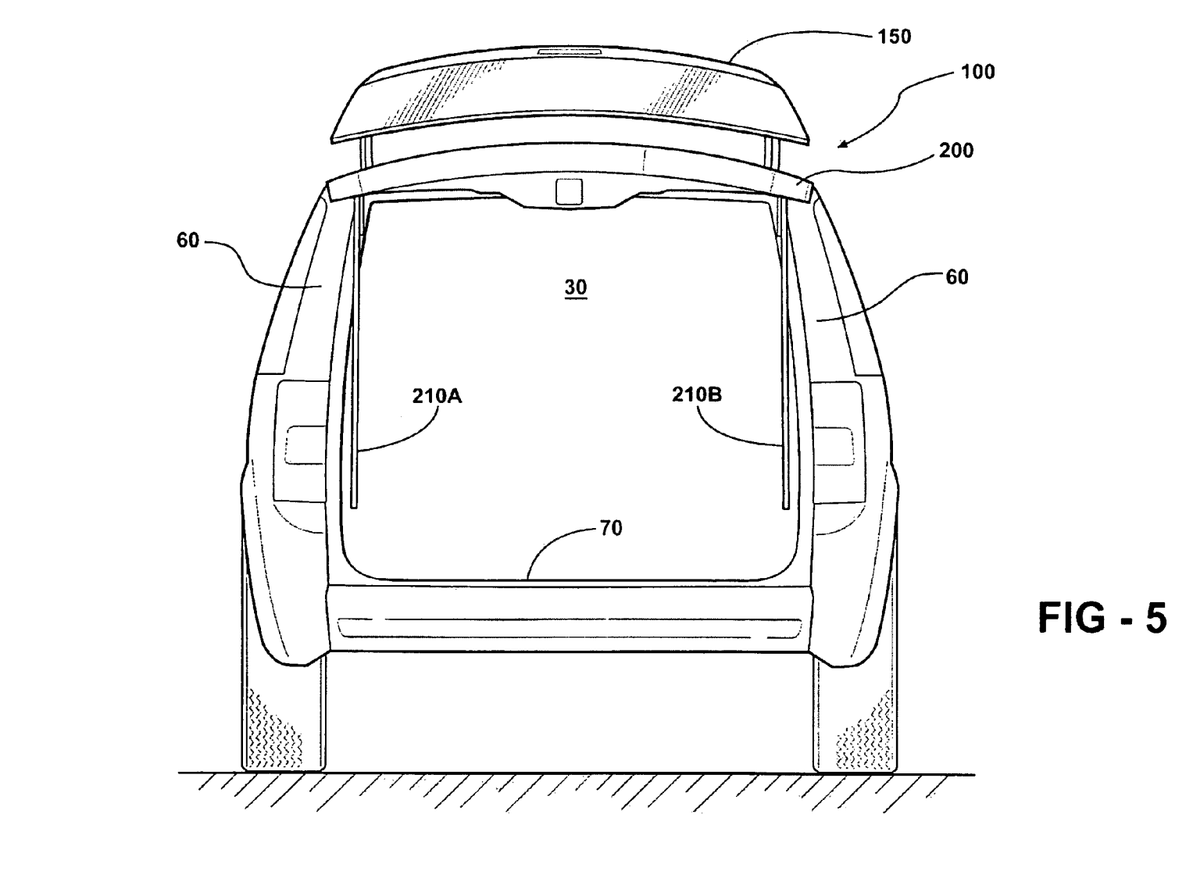
FIG. 5 is a back view of a vehicle aft-end with the closure system configured as a liftgate in the position shown in FIG. 4 according to the invention.
Figure 6:
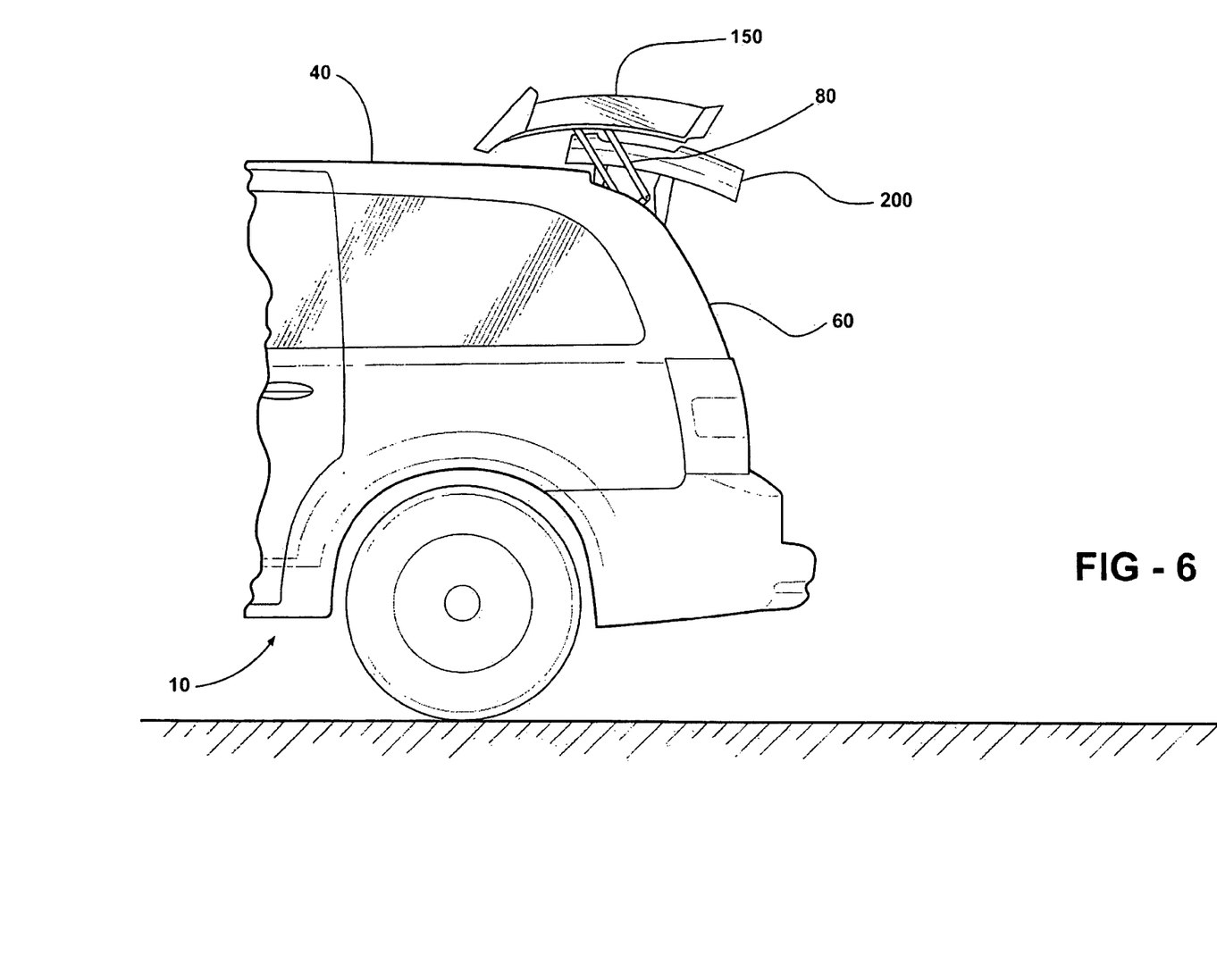
FIG. 6 is a side elevation view of a vehicle rear end with the closure system configured as a liftgate with the upper portion arranged to lift-up via a four-bar hinge.

Lower portion 200 covers the bottom section of opening 30 and is attached to vehicle aft-end 10 by a track system which includes track rail 210A and track rail 210B, as shown in FIG. 5. Track rails 210A and 210B are preferably formed from a high strength rigid material such as steel or engineered plastic. Track rails 210A, and 210B are mounted on each side 60 of body opening 30 and provide a means to guide movement of the lower portion from its closed position to its open position. Lower portion 200 moves along the track rails from a closed position generally flush and in sealing engagement with side edges 60 and adjacent floor 70 to an open position proximate roof 40 when upper portion 150 is in its full open position. Lower portion 200 preferably includes rollers or wheels mounted along its corresponding side edges (not shown) and arranged for sliding movement within track rails 210A and 210B to enable the lower portion's smooth operation.

Closure system 100 may additionally include a mechanical interlock (not shown) connecting upper portion 150 to lower portion 200 to move both portions in tandem between their respective open and closed positions. The mechanical interlock can be a linkage connecting the upper portion 150 and lower portion 200 to achieve a staggered and sequential order of movement of upper portion with respect to the lower portion 200, as described above. Said linkage would preferably be made from a rigid high strength material, such as steel or an engineered plastic, in order to reliably displace lower portion 200 between its open and closed positions. For convenience, closure system 100 may utilize an electric motor (not shown) to drive the mechanical interlock. Said electric motor may be positioned for remote actuation, either by a switch located inside the vehicle, or via a fob mounted radio signal transmitter.

Closure system 100 may include a window (not shown) mounted on upper portion 150 inside a corresponding window opening. The window may be arranged to pivot about at least one hinge mounted on the upper portion from a closed position generally flush with and in sealing engagement with the sides of the window opening to an extended open position. The window may include an actuator mounted on upper portion 150 to lock and unlock the pivoting action of the window. Movement of the window may also be assisted with one or more hydraulic cylinders.

Figure 7:
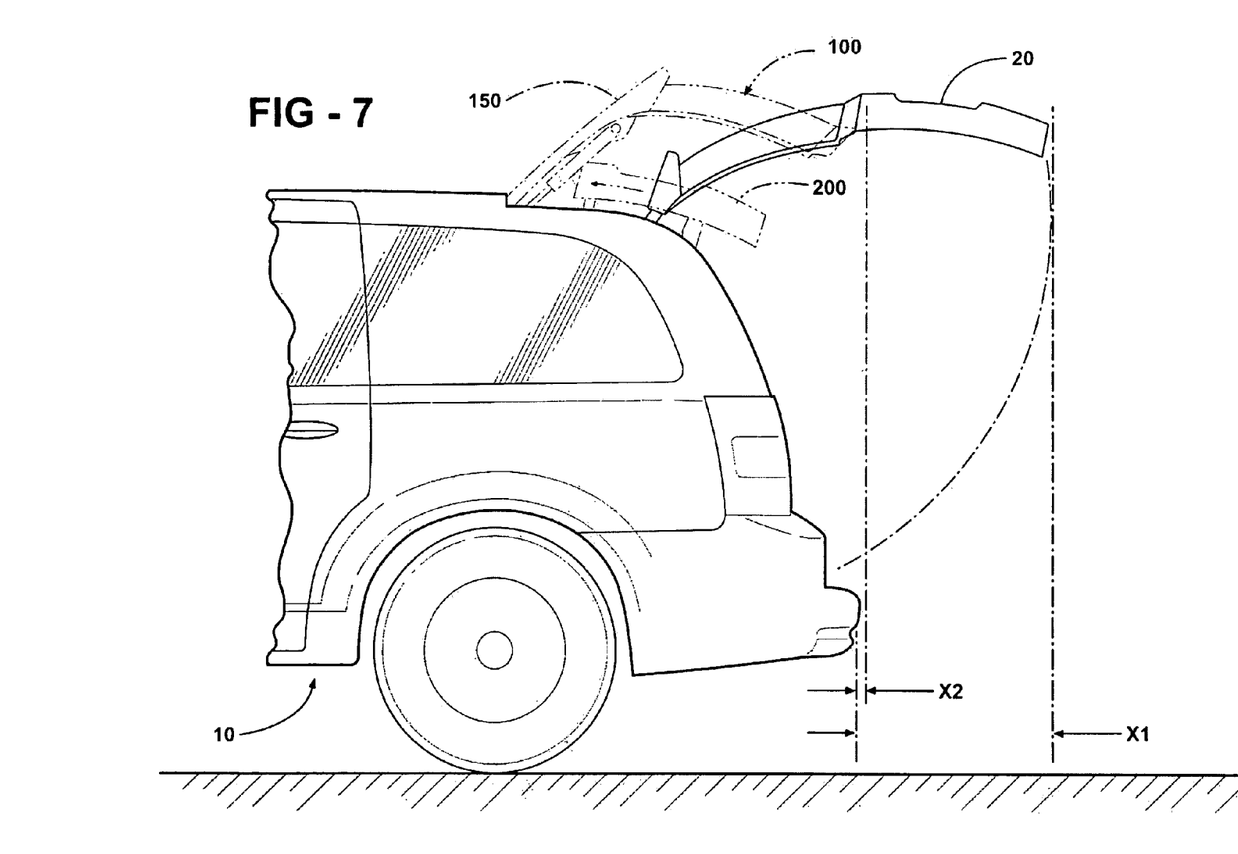
FIG. 7 is an out-swing distance comparison of a typical one-piece pivoting liftgate vs. the closure system configured as a liftgate according to the invention shown in phantom.

As a result of having separate upper and lower portions, and the lower portion being guided to the open position by track rails 210A and 210B, closure system 100 has a considerably smaller out-swing reach than does a more conventional one-piece pivoting liftgate. According to the invention, closure system out-swing reach X2 results solely from movement of upper portion 150, which is considerably smaller than the out-swing reach X1 of the one-piece pivoting liftgate, as shown in FIG. 7. Additionally, the closure system 100 may utilize a non-pivoting upper portion, which can be configured to generate further reduced out-swing. Closure system 100 provides for convenient access to the vehicle's cargo area when the vehicle is parked in a confined area because less space is required to clear the raising and lowering of the closure. It should be noted that although specifically described herein as a closure for the vehicle's aft-end, nothing precludes the invention from being utilized for an opening in any location on the body of a vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A closure system with a reduced out-swing reach for a vehicle having a body opening bounded by a floor, two sides and a roof, the closure system comprising:
    an upper portion attached to the body adjacent the roof and arranged to move from a closed upper portion position restricting the body opening to an open upper portion position exposing at least a section of the body opening;
    a track extending to adjacent the roof mounted at each side of the body opening; and a lower portion guided by said track from a closed lower portion position adjacent the floor to an open lower portion position proximate the roof when the upper portion is not in the closed upper portion position.

2. The closure system of claim 1 wherein the upper portion and the lower portion form a vehicle liftgate.

3. The closure system of claim 1 wherein the upper portion is attached relative to the roof by at least one hinge and is arranged to pivot about said hinge from, the closed position to the open position.

4. The closure system of claim 1 wherein the upper portion is attached to the roof by a linkage arranged to lift the upper portion from the closed position to the open position.

5. The closure system of claim 1 wherein the lower portion is disposed between the body opening and the upper portion in a nested relationship when both said portions are in the open position.

6. The closure system of claim 5 wherein the lower portion is spaced from and underlies at least a portion of the upper portion when the upper portion is disposed in the open upper portion position and the lower portion is disposed in the open lower portion position.

7. The closure system of claim 1 wherein the lower portion underlies at least a portion of the upper portion when the upper portion is disposed in the open upper portion position and the lower portion is disposed in the open lower portion position.

8. The closure system of claim 1 wherein the upper portion is independently movable relative to the lower portion between the closed upper portion position and the open upper portion position.

9. The closure system of claim 1 wherein the lower portion remains proximate the side edges when guided by the track between the closed lower portion position and the open lower portion position.

10. A vehicle having a closure system with a reduced out-swing reach, the vehicle comprising:
a body opening bounded by a floor, two sides and a roof;
the closure system comprising:
an upper portion attached to the body adjacent the roof and arranged to move from a closed upper portion position restricting the body opening to an open upper portion position exposing at least a section of the body opening;
a track mounted at each side of the body opening that extends to proximate the roof; and
a lower portion guided by said track from a closed lower portion position adjacent the floor to an open lower portion position proximate the roof when the upper portion is not in a closed upper portion position.

11. The vehicle of claim 10 wherein the upper portion and the lower portion form a vehicle liftgate.

12. The vehicle of clam 10 wherein the upper portion is attached to the roof by at least one hinge and is arranged to pivot about said hinge from the closed position to the open position.

13. The vehicle of claim 10 wherein the upper portion is attached to the roof by a linkage arranged to lift the upper portion from the closed position to the open position.

14. The vehicle of claim 10 wherein the lower portion is disposed between the body opening and the upper portion in a nested relationship when both said portions are in the open position.

15. The vehicle of claim 14 wherein the lower portion is spaced from and underlies at least a portion of the upper portion when the upper portion is disposed in the open upper portion position and the lower portion is disposed in the open lower portion position.

16. The vehicle of claim 10 wherein the lower portion underlies at least a portion of the upper portion when the upper portion is disposed in the open upper portion position and the lower portion is disposed in the open lower portion position.

17. The vehicle of claim 10 wherein the upper portion is independently movable relative to the lower portion between the closed upper portion position and the open upper portion position.

18. The vehicle of claim 10 wherein the lower portion remains adjacent the side edges when guided by the track between the closed lower portion position and the open lower portion position.

19. A tailgate in combination with a vehicle body comprising:
a vehicle body comprising a body opening bounded by a floor, a roof, and a pair of spaced apart sides extending upwardly from the floor to the roof, and a tack rail extending along each side from adjacent the floor to the roof;
a tailgate comprised of an upper tailgate portion and a lower tailgate portion with the upper tailgate portion movable between a closed upper tailgate portion position and an open upper tailgate portion position where the upper tailgate portion overlies part of the opening adjacent the roof and the lower tailgate portion is guidable by each track rail between a closed lower tailgate portion position and an open lower tailgate portion position where at least part of the lower tailgate portion underlies the upper tailgate portion and overlies part of the opening adjacent the roof; and
wherein the lower tailgate portion remains adjacent the vehicle body side edges when being guided along each track rail between the closed lower tailgate portion position and the open lower tailgate portion position.

20. The tailgate and vehicle combination of claim 19 wherein the upper tailgate portion is independently movable relative to the lower tailgate portion between the closed upper tailgate portion position and the open upper tailgate portion position.

* * * * *